United States Patent
Becker

(10) Patent No.: US 10,198,949 B2
(45) Date of Patent: Feb. 5, 2019

(54) METHOD AND SYSTEM FOR PARKING VERIFICATION VIA BLOCKCHAIN

(71) Applicant: Mastercard International Incorporated, Purchase, NY (US)

(72) Inventor: William Becker, Stamford, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 15/581,006

(22) Filed: Apr. 28, 2017

(65) Prior Publication Data

US 2018/0315309 A1    Nov. 1, 2018

(51) Int. Cl.
G08G 1/133    (2006.01)
H04L 9/06    (2006.01)

(52) U.S. Cl.
CPC .......... *G08G 1/133* (2013.01); *H04L 9/0637* (2013.01); *H04L 9/0643* (2013.01)

(58) Field of Classification Search
None
See application file for complete search history.

(56) References Cited

U.S. PATENT DOCUMENTS

| | | | | |
|---|---|---|---|---|
| 5,712,789 A * | 1/1998 | Radican | ................ | G06Q 10/08 700/226 |
| 6,340,935 B1 * | 1/2002 | Hall | ..................... | G07B 15/04 340/905 |
| 8,665,118 B1 * | 3/2014 | Woodard | ............... | G08G 1/144 340/425.5 |
| 8,854,205 B2 * | 10/2014 | Daniel | ................... | G06Q 10/08 340/2.1 |
| 9,222,795 B1 * | 12/2015 | Gerlach | ............ | G01C 21/3667 |
| 9,613,532 B2 * | 4/2017 | Smullin | ................. | G08G 1/142 |
| 9,754,487 B1 * | 9/2017 | Woodard | ............... | G08G 1/143 |
| 2005/0057373 A1 * | 3/2005 | Noguchi | .................. | G08G 1/14 340/932.2 |
| 2007/0040701 A1 * | 2/2007 | Browne | ................... | G08G 1/14 340/932.2 |

(Continued)

OTHER PUBLICATIONS

U.S. Appl. No. 15/386,552, by Prashanna S. Tiwaree, filed Dec. 21, 2016.

(Continued)

*Primary Examiner* — Curtis King
(74) *Attorney, Agent, or Firm* — Buchanan Ingersoll & Rooney PC

(57) ABSTRACT

A method for distributing parking availability data via blockchain includes: storing a blockchain comprised of a plurality of blocks, each block having a block header including a timestamp; receiving spot availability notifications including a common spot identifier and availability data; generating a transaction value including the common spot identifier and availability data; generating a new block header including i) a current timestamp, ii) a reference hash value generated via hashing of the block header included in a most recent block identified via the timestamp, and iii) a transaction hash value generated via hashing of the new transaction value; generating a new block comprised of the new block header and the new transaction value; and transmitting the generated new block.

16 Claims, 8 Drawing Sheets

(56) References Cited

U.S. PATENT DOCUMENTS

| | | | | |
|---|---|---|---|---|
| 2009/0037089 | A1* | 2/2009 | Tkachenko | G08G 1/04 701/118 |
| 2009/0088959 | A1* | 4/2009 | Mori | G08G 1/0104 701/118 |
| 2009/0261988 | A1* | 10/2009 | Ramirez Serrano | G07C 9/00182 340/932.2 |
| 2010/0302068 | A1* | 12/2010 | Bandukwala | G08G 1/14 340/932.2 |
| 2011/0015934 | A1* | 1/2011 | Rowe | G06Q 30/02 705/1.1 |
| 2011/0133957 | A1* | 6/2011 | Harbach | G08G 1/14 340/932.2 |
| 2012/0062395 | A1* | 3/2012 | Sonnabend | G06K 9/00791 340/932.2 |
| 2012/0136997 | A1* | 5/2012 | Yan | G06Q 10/06313 709/225 |
| 2013/0099941 | A1* | 4/2013 | Jana | H04W 4/023 340/905 |
| 2013/0113936 | A1* | 5/2013 | Cohen | G07B 15/02 348/148 |
| 2013/0135118 | A1* | 5/2013 | Ricci | H04W 4/90 340/932.2 |
| 2013/0158853 | A1* | 6/2013 | Li | G08G 1/143 701/400 |
| 2013/0176147 | A1* | 7/2013 | Anderson | G08G 1/143 340/932.2 |
| 2013/0257632 | A1* | 10/2013 | Harber | G08G 1/0112 340/932.2 |
| 2014/0085112 | A1* | 3/2014 | Gruteser | B60Q 9/004 340/932.2 |
| 2014/0118167 | A1* | 5/2014 | Im | G08G 1/092 340/901 |
| 2014/0176349 | A1* | 6/2014 | Smullin | G08G 1/142 340/932.2 |
| 2014/0302875 | A1* | 10/2014 | Beaurepaire | G08G 1/143 455/456.3 |
| 2014/0309917 | A1* | 10/2014 | Beaurepaire | G08G 1/017 701/300 |
| 2015/0066545 | A1* | 3/2015 | Kotecha | G06Q 10/02 705/5 |
| 2015/0161890 | A1* | 6/2015 | Huntzicker | G08G 1/144 340/932.2 |
| 2016/0231122 | A1* | 8/2016 | Beaurepaire | G01C 21/34 |
| 2016/0284217 | A1* | 9/2016 | Lee | G08G 1/143 |
| 2017/0046956 | A1* | 2/2017 | Gaebler | G01C 21/3492 |
| 2017/0083958 | A1 | 3/2017 | Unser et al. | |
| 2017/0098374 | A1* | 4/2017 | Sullivan | G06F 17/00 |
| 2017/0103654 | A1* | 4/2017 | Gaebler | G08G 1/14 |
| 2017/0118307 | A1* | 4/2017 | Beaurepaire | H04L 67/327 |
| 2018/0047288 | A1* | 2/2018 | Cordell | G08G 1/096888 |
| 2018/0081614 | A1* | 3/2018 | Tsai | G06F 3/1423 |

OTHER PUBLICATIONS

U.S. Appl. No. 15/211,111, by Steven C. Davis, filed Jul. 15, 2016.

Antonopoulos, "Mastering Bitcoin—Unlocking Digital Cryptocurrencies", First Edition, Dec. 1, 2014, pp. 1-17, O'Reilly Media, Inc., USA.

Charbax, "ARM mbed cloud with IBM Watson Internet of Things", Retrieved from the Internet, Published on Oct. 27, 2016, URL:https://www.youtube.com/watch?v=xa5U5dipdMY.

Dittmer, "Smart Parking Meter: From Bluetooth low energy to the IoT cloudposts/smart-parking meter", Retrieved from the Internet, Published on Mar. 28, 2017, URL:https://community.arm.com/iot/b/blog/post/smart-parking-meter-from-bluetooth-low-energy-to-the-iot-cloud.

Evans et al., "Thinking outside the blocks—A Strategic Perspective on Blockchain and Digital Tokens", Retrieved from the Internet, Published on Dec. 1, 2016, pp. 1-38, URL:http://media-publications.bcg.com/BCG-Thinking-Outside-the-Blocks-Dec-2016.pdf.

Lakeberg, Dapp Parking Places, Retrieved from the Internet, Published on May 28, 2016, URL:https://github.com/blakeberg/parking-dapp/blob/master/README.md.

Sumapair, "blockchain-samples / contacts / industry / parkingmeter / mbedParkingMeter / main.go—Github", Retrieved from the Internet, Published on Nov. 7, 2016, URL:https://github.com/ibm-watson-iot/blockchain-samples/blob/master/contacts/industry/parkingmeter/mbedParkingMeter/main.go.

Notification of Transmittal of the International Search Report and the Written Opinion of the International Searching Authority (Forms PCT/ISA/220, PCT/ISA/210 and PCT/ISA/237) dated Jul. 13, 2018, by the European Patent Application No. PCT/US2018/025017. (14 pages).

* cited by examiner

METHOD AND SYSTEM FOR PARKING VERIFICATION VIA BLOCKCHAIN

FIELD

The present disclosure relates to the distribution of parking availability data via blockchain, specifically the use of a blockchain to store information regarding vehicle occupancy of parking spaces for auditing and use in distributing data regarding the availability of parking spaces to nearby vehicles for use in identifying potential parking spots.

BACKGROUND

In some geographic areas, parking may be difficult for a driver to find. For example, heavily urbanized areas, like downtown areas in large metropolitan cities, may have street parking distributed throughout the area, but the number of overall spaces may be small compared to the number of drivers interested in parking in those spaces. In many cases, a driver may spend a significant amount of time traversing the streets before finding an available parking space. Sometimes, this space may end up being a significant distance from the driver's intended destination, which may be particularly frustrating to the driver if there were other available spaces closer to their destination that the driver was not aware of when trying to park.

Some methods have been developed to assist in identifying parking capacity and availability using available transactional data for merchants in the surrounding area, such as described in U.S. patent application Ser. No. 14/858,297, filed on Sep. 18, 2015, and U.S. patent application Ser. No. 15/386,552, filed on Dec. 21, 2016, which are herein incorporated by reference in their entirety. However, in some cases individuals may park in an area without transacting directly in that area, or transaction frequencies may be inconsistent with the amount of time spent parked in the nearby spaces. In such instances, the driver may be provided with an idea of the availability of parking in an area, but may not be confident that any particular parking space is open at that moment. However, providing more reliable parking information and enforcement of time restrictions present technical challenges regarding the detection of available parking locations as well as auditing and distribution of parking availability information.

Thus, there is a need for a technical solution for identifying parking spaces that are available for a driver based on direct identification of the availability of that parking space. In addition, there is a need for the technical solution to provide secured data regarding occupancy of parking spaces, which may be beneficial for auditing and assistance to drivers and law enforcement regarding parking disputes.

SUMMARY

The present disclosure provides a description of systems and methods for distributing parking availability and identifying available parking locations via the use of a blockchain. The blockchain provides an immutable record of occupancy of parking spaces such that a driver can be sure that a space is available when indicated as such (e.g., it cannot be tampered with to show an empty space as taken for a nefarious actor to hold a spot), and such that it may be useful in the auditing and dispute of parking space. For example, a driver may be given a ticket for parking in an area longer than allowed, where the immutability of the blockchain may enable it to be used as solid evidence that the driver's vehicle was (e.g., or was not, as the case may be) in the parking space longer than allowed. As such, the present systems and methods provide for easier identification of available parking spaces, as well as useful record keeping for the occupancy of parking spaces.

A method for distributing parking availability data via blockchain includes: storing, in a memory of a processing server, a blockchain comprised of a plurality of blocks, wherein each block is comprised of at least a block header and a plurality of transaction values, each block header including at least a timestamp; receiving, by a receiving device of a processing server, a spot availability notification from two or more computing devices, wherein each spot availability notification includes at least a common spot identifier and availability data; generating, by a generation module of the processing server, a new transaction value, wherein the new transaction value includes at least the common spot identifier and availability data included in the received spot availability notifications; generating, by the generation module of the processing server, a new block header, wherein the new block header includes at least i) a current timestamp, ii) a reference hash value generated via hashing of the block header included in a most recent block identified via the timestamp included in the block header, and iii) a transaction hash value generated via hashing of at least the new transaction value; generating, by the generation module of the processing server, a new block comprised of at least the new block header and the new transaction value; and electronically transmitting, by a transmitting device of the processing server, at least the generated new block.

A method for identifying available parking locations via blockchain includes: storing, in a location database of a computing device, a plurality of location data entries, wherein each location data entry includes at least a geographic location and a spot identifier; electronically transmitting, by a transmitting device of the computing device, a blockchain request, wherein the blockchain request includes at least one of: a blockchain identifier and a geographic location of the computing device; receiving, by a receiving device of the computing device, at least one blockchain, wherein each blockchain is comprised of a plurality of blocks, each block being comprised of at least a block header and a plurality of transaction values, where each block header includes at least a timestamp and each transaction value includes at least availability data and one of a plurality of spot identifiers; identifying, by a data identification module of the computing device, a most recent transaction value for each of the plurality of spot identifiers based on the timestamp included in the block header included in the block that includes the most recent transaction value; identifying, by the data identification module of the computing device, at least one spot identifier of the plurality of spot identifiers where the availability data included in the corresponding most recent transaction value includes an indication of positive parking availability; executing, by a querying module of the computing device, a query on the location database to identify, for each of the identified at least one spot identifiers, a location data entry where the included spot identifier corresponds to the respective spot identifier; and displaying, by a display device interfaced with the computing device, the geographic location included in each of the identified location data entries.

A system for distributing parking availability data via blockchain includes: a memory of a processing server configured to store a blockchain comprised of a plurality of blocks, wherein each block is comprised of at least a block header and a plurality of transaction values, each block header including at least a timestamp; a receiving device of a processing server configured to receive a spot availability notification from two or more computing devices, wherein each spot availability notification includes at least a common spot identifier and availability data; a generation module of the processing server configured to generate a new transaction value, wherein the new transaction value includes at least the common spot identifier and availability data included in the received spot availability notifications, a new block header, wherein the new block header includes at least i) a current timestamp, ii) a reference hash value generated via hashing of the block header included in a most recent block identified via the timestamp included in the block header, and iii) a transaction hash value generated via hashing of at least the new transaction value, and a new block comprised of at least the new block header and the new transaction value; and a transmitting device of the processing server configured to electronically transmit at least the generated new block.

A system for identifying available parking locations via blockchain includes: a location database of a computing device configured to store a plurality of location data entries, wherein each location data entry includes at least a geographic location and a spot identifier; a transmitting device of the computing device configured to electronically transmit a blockchain request, wherein the blockchain request includes at least one of: a blockchain identifier and a geographic location of the computing device; a receiving device of the computing device configured to receive at least one blockchain, wherein each blockchain is comprised of a plurality of blocks, each block being comprised of at least a block header and a plurality of transaction values, where each block header includes at least a timestamp and each transaction value includes at least availability data and one of a plurality of spot identifiers; a data identification module of the computing device configured to identify a most recent transaction value for each of the plurality of spot identifiers based on the timestamp included in the block header included in the block that includes the most recent transaction value, and identify at least one spot identifier of the plurality of spot identifiers where the availability data included in the corresponding most recent transaction value includes an indication of positive parking availability; a querying module of the computing device configured to execute a query on the location database to identify, for each of the identified at least one spot identifiers, a location data entry where the included spot identifier corresponds to the respective spot identifier; and a display device interfaced with the computing device configured to display the geographic location included in each of the identified location data entries.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Distribution of Parking Occupancy Data Via Blockchain

Figure 1:
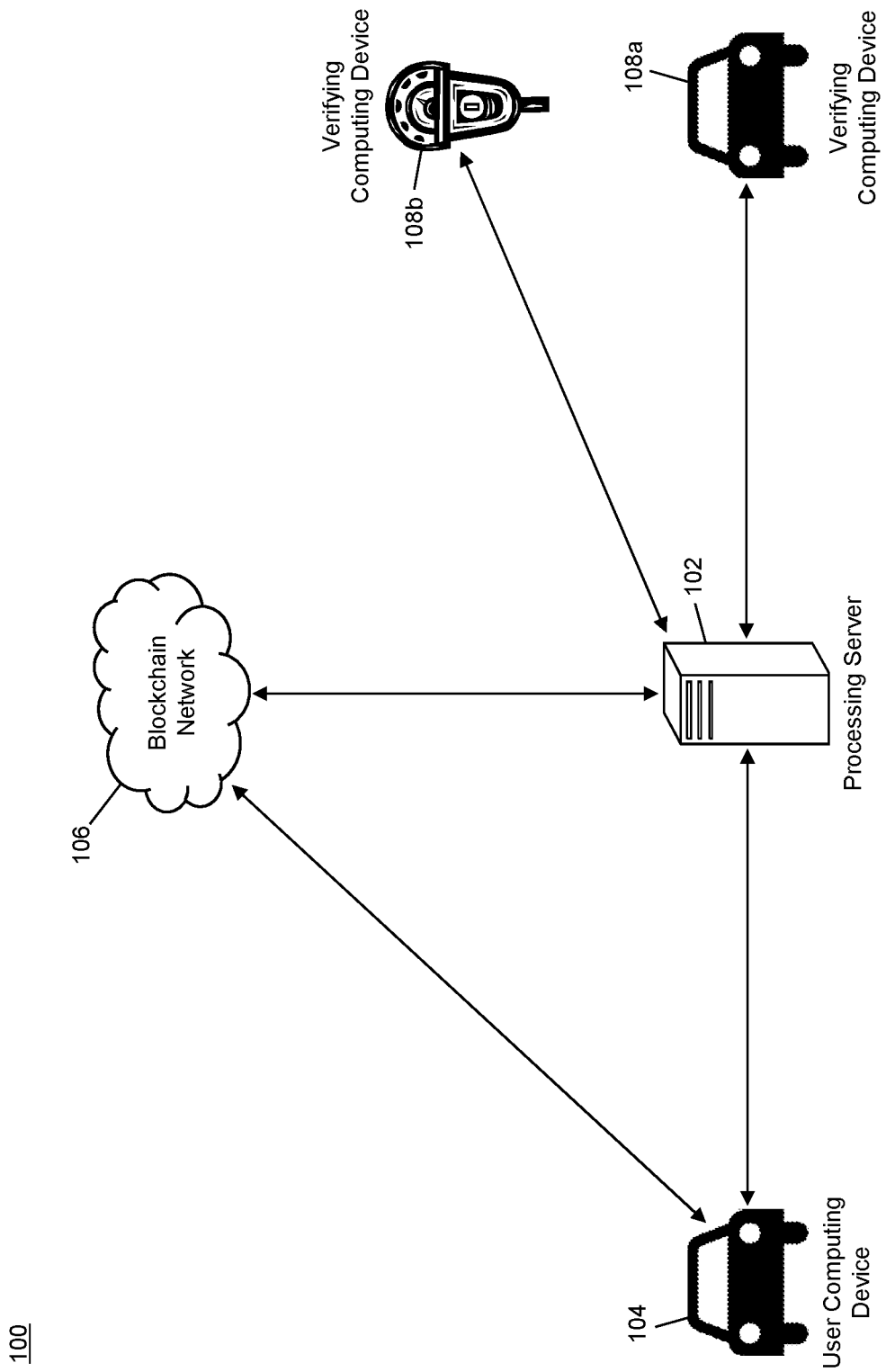
FIG. 1 is a block diagram illustrating a high level system architecture for identifying and distributing parking availability via blockchain in accordance with exemplary embodiments.

FIG. 1 illustrates a system 100 for the distribution of data associated with the occupancy of parking spaces, including indications of availability of parking spaces, using a blockchain.

The system 100 may include a processing server 102. The processing server 102, discussed in more detail below, may be configured to process updates regarding the occupancy of parking spaces for addition to a blockchain. The processing server 102 may be any type of computing device specially configured for performing the functions discussed herein, such as a specifically configured version of the computer system 800 illustrated in FIG. 8 and discussed below that is specifically configured to perform the functions discussed herein. The system 100 may also include a user computing device 104. The user computing device 104, discussed in more detail below, may be configured to identify availability of parking spaces via a blockchain, and may be configured to assist a user of the user computing device 104 with navigation to an available parking space. In some instances, the user computing device 104 may be the part of a computing system of a vehicle (e.g., included in or interfaced with a vehicle navigation system). In other instances, the user computing device 104 may be a device separate from a vehicle that may be used by a user of a vehicle for assistance in identifying an available parking space, like a mobile communication device (e.g., cellular phone, smart phone, smart watch, wearable computing device, etc.) configured to perform the functions discussed herein.

In the system 100, the processing server 102 and user computing device 104 may each be configured to communicate with a blockchain network 106. The blockchain network 106 may be comprised of a plurality of blockchain nodes, which may be specialized computing systems and/or devices that are configured to generate and verify blocks for addition to the blockchain using traditional methods and systems therefor. The processing server 102 and user computing device 104 may each be configured to communicate with one or more of the nodes of the blockchain network 106. As discussed in more detail below, the processing server 102 may be configured to submit data to a node for addition to the blockchain, and the user computing device 104 may be configured to receive blockchain data from the a node in the blockchain network 106.

The system 100 may include a plurality of verifying computing devices 108. As illustrated in FIG. 1, the verifying computing devices 108 may include a variety of different computing devices, such as the verifying computing device 108a and verifying computing device 108b. Each verifying computing device 108 may be configured to identify and verify the occupancy status of one or more parking spaces. For example, the verifying computing device 108a may be a vehicle equipped with a camera or other optical imaging device configured to take images of parking spaces to identify if the parking space is available and, if occupied, identify the vehicle in the parking space, such as by identifying the vehicle's color, make, model, license plate number, or other discernible information. In some cases, the verifying computing device 108a may be a user operated vehicle, such as may be configured to also operate as a user computing device 104. In other cases, the verifying computing device 108a may be an autonomous or semi-autonomous vehicle that may be configured to travel around collecting occupancy data for parking spaces. In another example, the verifying computing device 108b may be a parking meter or other device located at or in proximity to one or more parking spaces, which may be configured to identify the occupancy of the parking space(s), such as using optical images or other suitable techniques. For instance, a verifying computing device 108 may be configured to receive data transmitted via radio frequency or other type of wireless communication, and may receive data transmitted by user computing devices 104 or other vehicle systems for identification of a vehicle occupying a parking space, where lack of any such data may indicate availability of the parking space.

A verifying computing device 108 may identify availability data for one or more parking spaces. Each parking space may be associated with a spot identifier, which may be a unique value used for identification of the associated parking space. The spot identifier may be, for instance, an identification number, alphanumeric code, combination of numbers (e.g., the postal code in which the parking space is located plus an identification number), etc. The availability data may include data regarding occupancy of the parking space, such as an indication of positive availability of the parking space (e.g., the space is currently unoccupied and available for parking) or data associated with a vehicle occupying the space, such as the vehicle's license plate number, color, make, model, etc., an image of the vehicle, data emitted by the vehicle and received by the verifying computing device 108, etc. The verifying computing device 108 may be configured to electronically transmit a spot availability notification for each parking spot, which may include the availability data and spot identifier for the parking spot, identified by the verifying computing device 108 to the processing server 102 using a suitable communication network and method, such as via a cellular communication network, wireless area network, the Internet, etc.

The processing server 102 may receive parking spot notifications from verifying computing devices 108 and may be configured to update a blockchain accordingly. In some embodiments, the processing server 102 may be configured to wait to update any specific parking space until at least a predetermined number of parking spot notifications for that parking space are received. For instance, the processing server 102 may require two parking spot notifications to be received for a parking space (e.g., where the parking spot notifications both include the same spot identifier) within a predetermined period of time (e.g., 5 minutes) before updating the blockchain with availability of that parking space. In some cases, the number of parking spot notifications and the period of time may vary depending on success of the processing server 102 in updating the blockchain and feedback received from users of the service. In some cases, the values may vary based on location. For example, a busier urban area may have more parking spot notifications received for each parking spot and may thus use a higher predetermined number and/or lower predetermined period of time, whereas a sparser, more rural area may use a smaller predetermined number and/or higher predetermined period of time.

Once the processing server 102 has received a suitable number of parking spot notifications for a parking space, the processing server 102 may be configured to update an associated blockchain. In one embodiment, the system 100 may include a plurality of different blockchains, which may be associated with the same or separate blockchain networks 106, where each blockchain may be used for a different geographic area. For instance, each block in a city may have a different blockchain associated therewith, for storage of availability data for parking spaces in that block. In another embodiment, the system 100 may use a single blockchain, which may utilize partitions for geographic areas. The use of partitions in blockchains is described in more detail in U.S.

patent application Ser. No. 15/211,111, by Steven C. Davis, filed Jul. 15, 2016, which is herein incorporated by reference in its entirety. As discussed herein, a partitioned blockchain may be used in place of multiple blockchains where applicable.

For a parking space where a suitable number of parking spot notifications have been received, the processing server 102 may generate a new transaction value. The transaction value may include at least the spot identifier associated therewith and the availability data included in the received parking spot notifications. The processing server 102 may then submit the transaction value to a node associated with the blockchain network 106 (e.g., associated with the blockchain to which the parking space corresponds, such as based on the geographic area) for inclusion in a block that is verified and added to the blockchain. In some cases, the processing server 102 may only update the blockchain for a parking space when the availability data for that parking space changes. In such cases, the processing server 102 may identify the most recent transaction value added to the blockchain that includes the spot identifier for the parking space, and may only generate and submit a new transaction value when the availability data in the recent transaction value is different from the availability data included in the received parking spot notifications.

The node in the blockchain network 106 may receive the new transaction value and may proceed to add the transaction value into a new block generated for verification and addition to the blockchain. In some embodiments, the processing server 102 may be a blockchain node. In such embodiments, the processing server 102 may be configured to generate a new block for verification and addition to the blockchain. Each new block may be comprised of at least a block header and one or more transaction values. The block header may be comprised of at least a timestamp, a reference hash value, and a transaction hash value. The timestamp may be a timestamp for the current time when the block header is generated and/or to be added to the blockchain. The reference hash value may be a hash value generated via hashing of the block header of the most recent block added to the blockchain. The transaction hash value may be a hash value generated via hashing of the one or more transaction values to be included in the new block being generated (e.g., including the new transaction value for the parking spot whose availability data is being updated). The two hash values may provide for immutability of the blockchain, as any change to a transaction value will result in a different transaction hash value, which will result in the reference hash value generated from that block header being different as well, prohibiting any change in transaction values in the blockchain as such a change would carry through to every subsequent block in the blockchain.

Once the new block is generated by the processing server 102, the new block may be electronically transmitted to one or more other nodes in the blockchain network 106 for verification and validation thereof using traditional methods and systems. The block may then be added to the blockchain, where the processing server 102 may receive confirmation of the block's addition to the blockchain.

The user computing device 104 may be configured to retrieve updated blockchains for use in identifying parking spaces available for parking. In some cases, the user computing device 104 may requested updated blockchains when prompted by a user thereof. For instance, the user of the user computing device 104 may input a destination for which parking space availability is requested. The user computing device 104 may then identify one or more blockchains associated with the destination (e.g., for blocks in the geographic area) and may transmit requests to the associated blockchain network(s) 106 for receipt of the most recent version of the blockchain. In some instances, the user computing device 104 may receive updates for each blockchain as they occur (e.g., upon addition of a new block to the blockchain). In such instances, the computing device 104 may identify the blockchains stored locally that are associated with the destination.

Once the appropriate blockchains are identified, the user computing device 104 may then identify the most recent transaction value for each of the parking spaces in the destination area as indicated by the user. For instance, the user computing device 104 may store the spot identifiers for each parking space in a geographic area (e.g., a city) and may identify the spot identifiers associated with parking spaces in the destination area (e.g., a set of blocks) selected by the user. The user computing device 104 may identify the most recent transaction value for each of the spot identifiers, based on the timestamp included in the block headers in the blocks of the blockchains. For example, the user computing device 104 may start at the block most recently added to the blockchain (e.g., based on the timestamp) and may query each of the transaction values stored therein to identify any that include one of the spot identifiers to be examined, and may then proceed to the next most recent block and examine its transaction values, and continue to do so until a transaction value for each of the spot identifiers has been identified.

The user computing device 104 may then examine the availability data in each of the identified transaction values to identify parking spots where the availability data indicates positive availability of parking. The user computing device 104 may then inform the user of each of the parking spots that are available for parking using a display device or other computing device interfaced therewith. For instance, in one example the user computing device 104 may present the user with a list of all parking spaces in the destination area that are available for selection by the user. In another example, the user computing device 104 may identify a single available parking space (e.g., closest to the destination, closest to the user computing device 104, fastest to navigate to, etc.) and may present it to the user. In yet another example, the user computing device 104 may display a graphical illustration of the destination area and may indicate the available parking spaces thereon. In some cases, the user computing device 104 may provide navigational instructions for travel to one or more of the available parking spaces.

The user may then drive their vehicle to one of the available parking spaces and park therein. As the user's vehicle remains there, verifying computing devices 108 may identify the vehicle's occupancy of the parking space, which may be provided to the processing server 102 in parking spot notifications for updating to the blockchain accordingly. The user's parking of their vehicle in the parking space may thus be registered in the immutable record of the blockchain such that the user may rely on the blockchain in any potential disputes that may arise from the parking. For example, the user may receive a ticket for parking in the parking space longer than may be allowed. In instances where the ticket may be issued mistakenly (e.g., an agent may mistake the vehicle for a similar vehicle previously occupying the spot and think the vehicle was parked longer than an allowed time), the user may be able to rely on the blockchain as proof of when the vehicle was parked in the parking space to dispute the ticket, due to the immutability and accuracy of the blockchain.

The methods and systems discussed herein enable parking space availability to be identified and stored via a blockchain for immutability of the data for reliability in its usage in identifying available parking spaces and auditing past parking information. As a result, the methods and systems discussed herein may provide drivers and other vehicle users with the ability to reliably identify available parking spaces in a desired destination, and can provide drivers as well as governmental agencies and property owners with reliable, immutable information regarding the usage of parking spaces to ensure that all laws and regulations are complied with and followed correctly.

Processing Server

Figure 2:
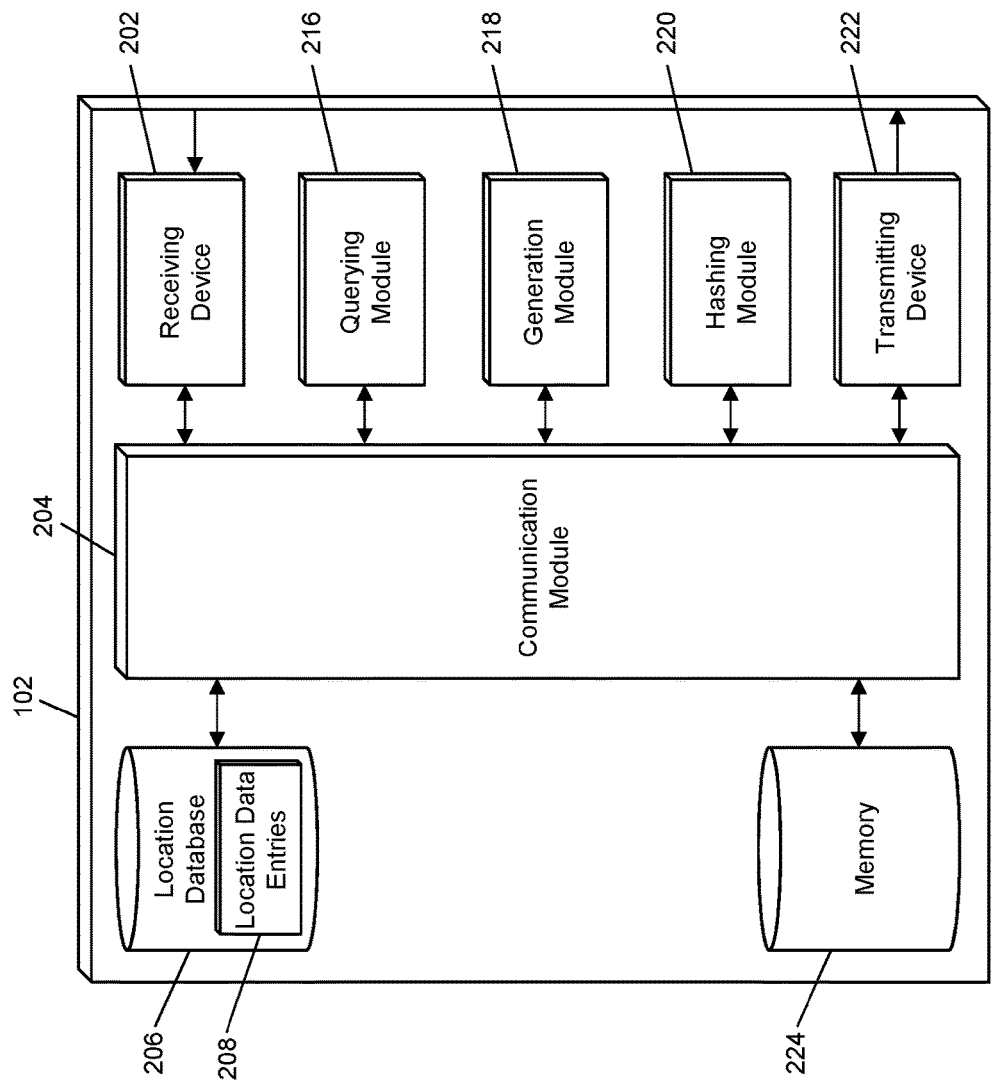
FIG. 2 is a block diagram illustrating the processing server of the system of FIG. 1 for distributing parking availability via blockchain in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 800 illustrated in FIG. 8 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from user computing devices 104, blockchain networks 106, verifying computing devices 108, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by verifying computing devices 108, which may be superimposed or otherwise encoded with parking spot notifications, which may include spot identifiers and availability data. The receiving device 202 may also be configured to receive data signals electronically transmitted by blockchain networks 106 (e.g., via nodes associated therewith), which may be superimposed or otherwise encoded with blockchain data. In some cases, the receiving device 202 may be configured to receive data signals electronically transmitted by user computing devices 104, which may be superimposed or otherwise encoded with data requests, such as may request spot identifiers for a geographic area, blockchain data, availability data, etc.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 216, generation module 218, hashing module 220, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may include a location database 206. The location database 206 may be configured to store a plurality of location data entries 208 using a suitable data storage format and schema. The location database 206 may be a relational database that utilizes structured query language for the storage, identification, modifying, updating, accessing, etc. of structured data sets stored therein. Each location data entry 208 may be a structured data set configured to store data related to a parking space, where the location data entry 208 may include the associated spot identifier, and may also include availability data, the associated blockchain (e.g., or identification data associated therewith), and/or spot availability notifications received for the related parking space. In some embodiments, a location data entry 208 may be related to a geographic area and may include the geographic area, a blockchain associated with the geographic area or an identification value associated therewith, and one or more spot identifiers located in the geographic area.

The processing server 102 may include a querying module 216. The querying module 216 may be configured to execute queries on databases to identify information. The querying module 216 may receive one or more data values or query strings, and may execute a query string based thereon on an indicated database, such as the location database 206, to identify information stored therein. The querying module 216 may then output the identified information to an appropriate engine or module of the processing server 102 as necessary. The querying module 216 may, for example, execute a query on the location database 206 to store a newly received spot availability notification in the location data entry 208 related to the associated parking space based on the spot identifier, and may also be configured to identify the number of spot availability notifications received for a parking space during a predetermined period of time.

The processing server 102 may also include a generation module 218. The generation module 218 may be configured to generate data for use in performing the functions of the processing server 102 as discussed herein. The generation module 218 may receive an instruction as input, may generate data as instructed, and may output the generated data to another module or engine of the processing server 102. For example, the generation module 218 may be configured to generate transaction values for parking spaces, which may include a spot identifier associated therewith and availability data for the parking space as identified from spot availability notifications received by the receiving device 202. In embodiments where the processing server 102 may be a blockchain node, the generation module 218 may also be configured to generate block headers and new blocks for addition to the blockchain.

The processing server 102 may include a hashing module 220. The hashing module 220 may be configured to apply hashing algorithms to data for the generation of hash values based thereon. The hashing module 220 may receive data to be hashed, may generate a hash value via application of one or more hashing algorithms to the data, and may output the generated hash value to another module or engine of the processing server 102. In some embodiments, the hashing module 220 may receive the hashing algorithm(s) or instructions for the selection thereof as part of the input. In other embodiments, the hashing module 220 may be configured to identify (e.g., via instructing of the querying module 216 to query a memory 224) the hashing algorithm(s) for use in generating the hash values as instructed.

The processing server 102 may also include a transmitting device 222. The transmitting device 222 may be configured to transmit data over one or more networks via one or more network protocols. In some instances, the transmitting device 222 may be configured to transmit data to user computing devices 104, blockchain networks 106, verifying computing devices 108, and other entities via one or more communication methods, local area networks, wireless area networks, cellular communication, Bluetooth, radio frequency, the Internet, etc. In some embodiments, the transmitting device 222 may be comprised of multiple devices, such as different transmitting devices for transmitting data over different networks, such as a first transmitting device for transmitting data over a local area network and a second transmitting device for transmitting data via the Internet. The transmitting device 222 may electronically transmit data signals that have data superimposed that may be parsed by a receiving computing device. In some instances, the transmitting device 222 may include one or more modules for superimposing, encoding, or otherwise formatting data into data signals suitable for transmission.

The transmitting device 222 may be configured to electronically transmit data signals to blockchain networks 106, which may be superimposed or otherwise encoded with transaction values and/or blocks for verification and addition to the associated blockchain. In some embodiments, the transmitting device 222 may also be configured to electronically transmit data signals to user computing device 104, such as in embodiments where the user computing device 104 may access parking availability data through the processing server 102. In such cases, such data signals may be superimposed or otherwise encoded with spot identifiers, geographic locations, availability data, blockchain data, etc.

The processing server 102 may also include a memory 224. The memory 224 may be configured to store data for use by the processing server 102 in performing the functions discussed herein, such as public and private keys, symmetric keys, etc. The memory 224 may be configured to store data using suitable data formatting methods and schema and may be any suitable type of memory, such as read-only memory, random access memory, etc. The memory 224 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 224 may be comprised of or may otherwise include a relational database that utilizes structured query language for the storage, identification, modifying, updating, accessing, etc. of structured data sets stored therein. The memory 224 may be configured to store, for example, one or more blockchains for use in the generation of new blocks to incorporate data from received spot availability notifications.

User Computing Device

Figure 3:
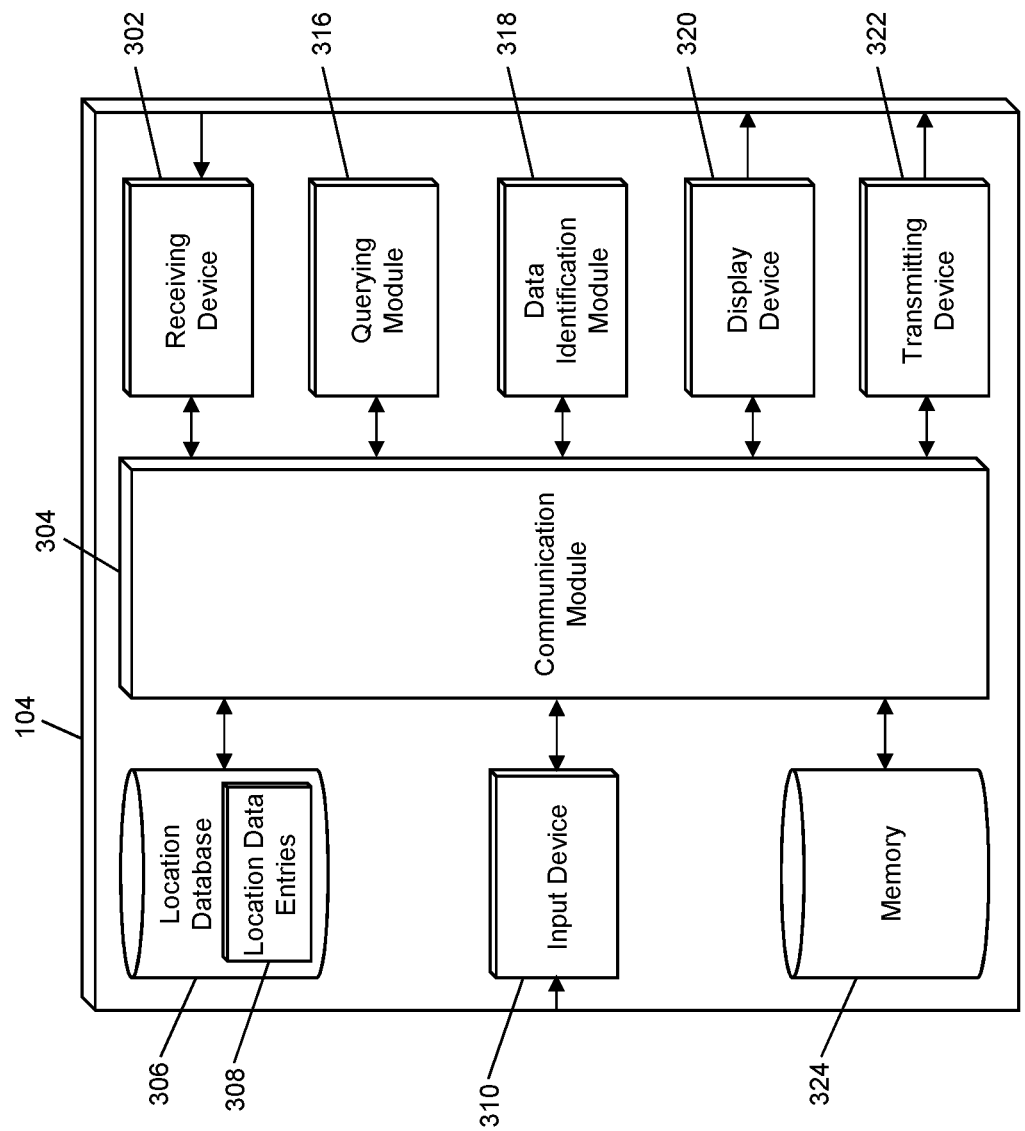
FIG. 3 is a block diagram illustrating the user computing device of the system of FIG. 1 for identifying available parking locations via blockchain in accordance with exemplary embodiments.

FIG. 3 illustrates an embodiment of a user computing device 104 in the system 100. It will be apparent to persons having skill in the relevant art that the embodiment of the user computing device 104 illustrated in FIG. 3 is provided as illustration only and may not be exhaustive to all possible configurations of the user computing device 104 suitable for performing the functions as discussed herein. For example, the computer system 800 illustrated in FIG. 8 and discussed in more detail below may be a suitable configuration of the user computing device 104.

The user computing device 104 may include a receiving device 302. The receiving device 302 may be configured to receive data over one or more networks via one or more network protocols. In some instances, the receiving device 302 may be configured to receive data from processing servers 102, blockchain networks 106, and other systems and entities via one or more communication methods, such as radio frequency, local area networks, cellular communication networks, wireless area networks, Bluetooth, the Internet, etc. In some embodiments, the receiving device 302 may be comprised of multiple devices, such as different receiving devices for receiving data over different networks, such as a first receiving device for receiving data over a local area network and a second receiving device for receiving data via the Internet. The receiving device 302 may receive electronically transmitted data signals, where data may be superimposed or otherwise encoded on the data signal and decoded, parsed, read, or otherwise obtained via receipt of the data signal by the receiving device 302. In some instances, the receiving device 302 may include a parsing module for parsing the received data signal to obtain the data superimposed thereon. For example, the receiving device 302 may include a parser program configured to receive and transform the received data signal into usable input for the functions performed by the processing device to carry out the methods and systems described herein.

The receiving device 302 may be configured to receive data signals electronically transmitted by blockchain networks 106, which may be superimposed or otherwise encoded with blocks verified and added to the blockchain. The receiving device 202 may also be configured to receive data signals electronically transmitted by the processing server 102, which may be superimposed or otherwise encoded with spot identifier and geographic location correspondences, availability data, blockchain data, or other data for use in performing the functions discussed herein.

The user computing device 104 may also include a communication module 304. The communication module 304 may be configured to transmit data between modules, engines, databases, memories, and other components of the user computing device 104 for use in performing the functions discussed herein. The communication module 304 may be comprised of one or more communication types and utilize various communication methods for communications within a computing device. For example, the communication module 304 may be comprised of a bus, contact pin connectors, wires, etc. In some embodiments, the communication module 304 may also be configured to communicate between internal components of the user computing device 104 and external components of the user computing device 104, such as externally connected databases, display devices, input devices, etc. The user computing device 104 may also include a processing device. The processing device may be configured to perform the functions of the user computing device 104 discussed herein as will be apparent to persons having skill in the relevant art. In some embodiments, the processing device may include and/or be comprised of a plurality of engines and/or modules specially configured to perform one or more functions of the processing device, such as a querying module 316, data identification module 318. As used herein, the term "module" may be software or hardware particularly programmed to receive an input, perform one or more processes using the input, and provides an output. The input, output, and processes performed by various modules will be apparent to one skilled in the art based upon the present disclosure.

The user computing device 104 may include a location database 306. The location database 306 may be configured to store a plurality of location data entries 308 using a suitable data storage format and schema. The location database 306 may be a relational database that utilizes structured query language for the storage, identification, modifying, updating, accessing, etc. of structured data sets stored therein. Each location data entry 608 may be a structured data set configured to store data related to a parking space, where the location data entry 308 may include the associated spot identifier and a geographic location of the related parking space. In some instances, a location data entry 308 may store availability data identified from an associated blockchain.

The user computing device 104 may also include or be otherwise interfaced with one or more input devices 310. The input devices 310 may be internal to the user computing device 104 or external to the user computing device 104 and connected thereto via one or more connections (e.g., wired or wireless) for the transmission of data to and/or from. The input devices 310 may be configured to receive input from a user of the user computing device 104, which may be provided to another module or engine of the user computing device 104 (e.g., via the communication module 204) for processing accordingly. Input devices 310 may include any type of input device suitable for receiving input for the performing of the functions discussed herein, such as a keyboard, mouse, click wheel, scroll wheel, microphone, touch screen, track pad, camera, optical imager, etc. The input device 310 may be configured to, for example, receive input selecting a destination area for identification of parking availability, selecting one of a plurality of available parking spaces identified by the user computing device 104, input requesting navigation to an available parking space, etc.

The user computing device 104 may include a querying module 316. The querying module 316 may be configured to execute queries on databases to identify information. The querying module 316 may receive one or more data values or query strings, and may execute a query string based thereon on an indicated database, such as the location database 306, to identify information stored therein. The querying module 316 may then output the identified information to an appropriate engine or module of the user computing device 104 as necessary. The querying module 316 may, for example, execute a query on the location database 306 to identify a plurality of location data entries 308 whose geographic locations are in a destination area (e.g., received via an input device 310) for identification of the spot identifiers included therein. The querying module 316 may also be configured to execute queries on blockchain data to identify transaction values stored therein and the spot identifiers and availability data included therein.

The user computing device 104 may also include a data identification module 318. The data identification module 318 may be configured to identify data as part of the functions of the user computing device 104 as discussed herein. The data identification module 318 may receive an instruction as input, may identify data as instructed, and may output the identified data to another module or engine of the user computing device 104. For example, the data identification module 318 may be configured to identify a most recent transaction value for one or more spot identifiers, where the most recent transaction value may be identified based on the timestamp included in the block header of a block that includes the transaction value. The data identification module may also be configured to identify spot identifiers from a plurality of spot identifiers that are associated with available parking spaces based on availability data included in transaction values associated therewith. In some embodiments, the data identification module 318 may also be configured to identify navigational data, such as for navigating from a geographic location of the user computing device 104 to a geographic location of an available parking space using traditional methods and systems.

The user computing device 104 may also include or be otherwise interfaced with a display device 320. The display device 320 may be internal to the user computing device 104 or external to the user computing device 104 and connected thereto via one or more connections (e.g., wired or wireless) for the transmission of data to and/or from. The display device 320 may be configured to display data to a user of the user computing device 104. The display device 320 may be any type of display suitable for displaying data as part of the functions discussed herein, such as a liquid crystal display, light emitting diode display, thin film transistor display, capacitive touch display, cathode ray tube display, light projection display, etc. In some instances, the user computing device 104 may include multiple display devices 320. The display device 320 may be configured to, for example, display a list of available parking spaces, display a map of a geographic area that indicates available parking spaces thereon, display navigation information for navigating to an available parking space, etc.

The user computing device 104 may also include a transmitting device 322. The transmitting device 322 may be configured to transmit data over one or more networks via one or more network protocols. In some instances, the transmitting device 322 may be configured to transmit data to processing servers 102, blockchain networks 106, and other entities via one or more communication methods, local area networks, wireless area networks, cellular communication networks, Bluetooth, radio frequency, the Internet, etc. In some embodiments, the transmitting device 322 may be comprised of multiple devices, such as different transmitting devices for transmitting data over different networks, such as a first transmitting device for transmitting data over a local area network and a second transmitting device for transmitting data via the Internet. The transmitting device 322 may electronically transmit data signals that have data superimposed that may be parsed by a receiving computing device. In some instances, the transmitting device 322 may include one or more modules for superimposing, encoding, or otherwise formatting data into data signals suitable for transmission.

The transmitting device 322 may be configured to electronically transmit data signals to processing servers 102 and/or blockchain networks 106 that are superimposed or otherwise encoded with blockchain data requests, where such requests may include blockchain identifiers or geographic area data for use in identifying corresponding blockchains. In some instances, the transmitting device 322 may electronically transmit data signals to processing servers 102 that are superimposed or otherwise encoded with requests for parking space data, such as for requesting spot identifiers and geographic locations of parking spaces for storage in the location database 306.

Process for Identification of Available Parking Spaces Via Blockchain

Figure 4:
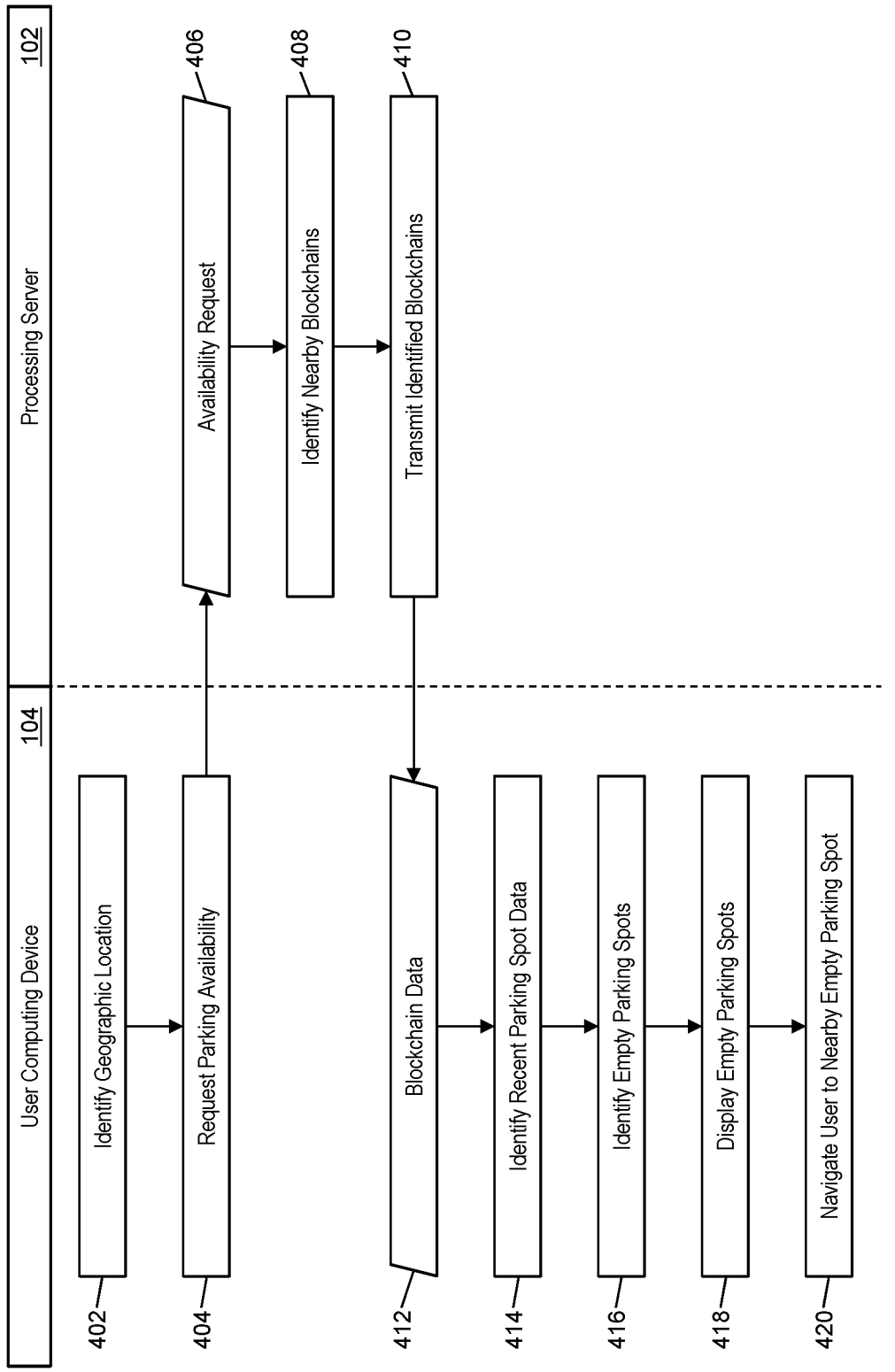
FIG. 4 is a flow diagram illustrating a process for identifying available parking locations for display to a user via a blockchain in the system of FIG. 1 in accordance with exemplary embodiments.

FIG. 4 illustrates a process for the identification of available parking spaces via the use of a blockchain in the system 100.

In step 402, the user computing device 104 may identify a geographic location for which parking availability data is requested. In some embodiments, the geographic location may be input into the user computing device 104 by a user thereof, such as via the use of an input device 310 interfaced therewith. In other embodiments, the geographic location may be received by the receiving device 302 of the user computing device 104, such as from another computing device interfaced therewith. In step 404, the transmitting device 322 of the user computing device 104 may electronically transmit a parking availability request to the processing server 102.

In step 406, the receiving device 202 of the processing server 102 may receive the parking availability request. The parking availability request may include at least the geographic location for which parking availability data is requested. In step 408, the querying module 216 of the processing server 102 may execute a query on the location database 206 of the processing server 102 to identify location data entries 208 whose geographic areas are included in or near the geographic location identified in the parking availability request. The processing server 102 may identify the blockchains for each of the location data entries 208, which may be stored therein or requested from associated blockchain networks 106 (e.g., by the transmitting device 222 of the processing server 102 and received by the receiving device 202). In step 410, the transmitting device 222 may electronically transmit each of the identified blockchains to the user computing device 104.

In step 412, the receiving device 302 of the user computing device 104 may receive the identified blockchains, where each blockchain includes a plurality of blocks comprised of a block header with a timestamp and references values and one or more transaction values, each comprised of a spot identifier and availability data. In step 414, the data identification module 318 of the user computing device 104 may identify the most recent transaction value for each parking space located in or near the geographic location based on the associated spot identifier and the timestamps included in each of the block headers for the blocks comprising the blockchain. In step 416, the data identification module 318 may identify which of the parking spaces are available based on the availability data included in the most recent transaction value for each of the respective parking spaces.

In step 418, the display device 320 interfaced with the user computing device 104 may display a list of the available parking spaces to a user thereof. The input device 310 interfaced with the user computing device 104 may receive a selection from the user, selecting one of the available parking spaces. The display device 320 may then, in step 420, display navigation information to navigate the user to the selected available parking space, such as by providing a list of directions from the current geographic location to the selected parking space and/or displaying a map where a route to the selected parking space is illustrated.

Figure 5:
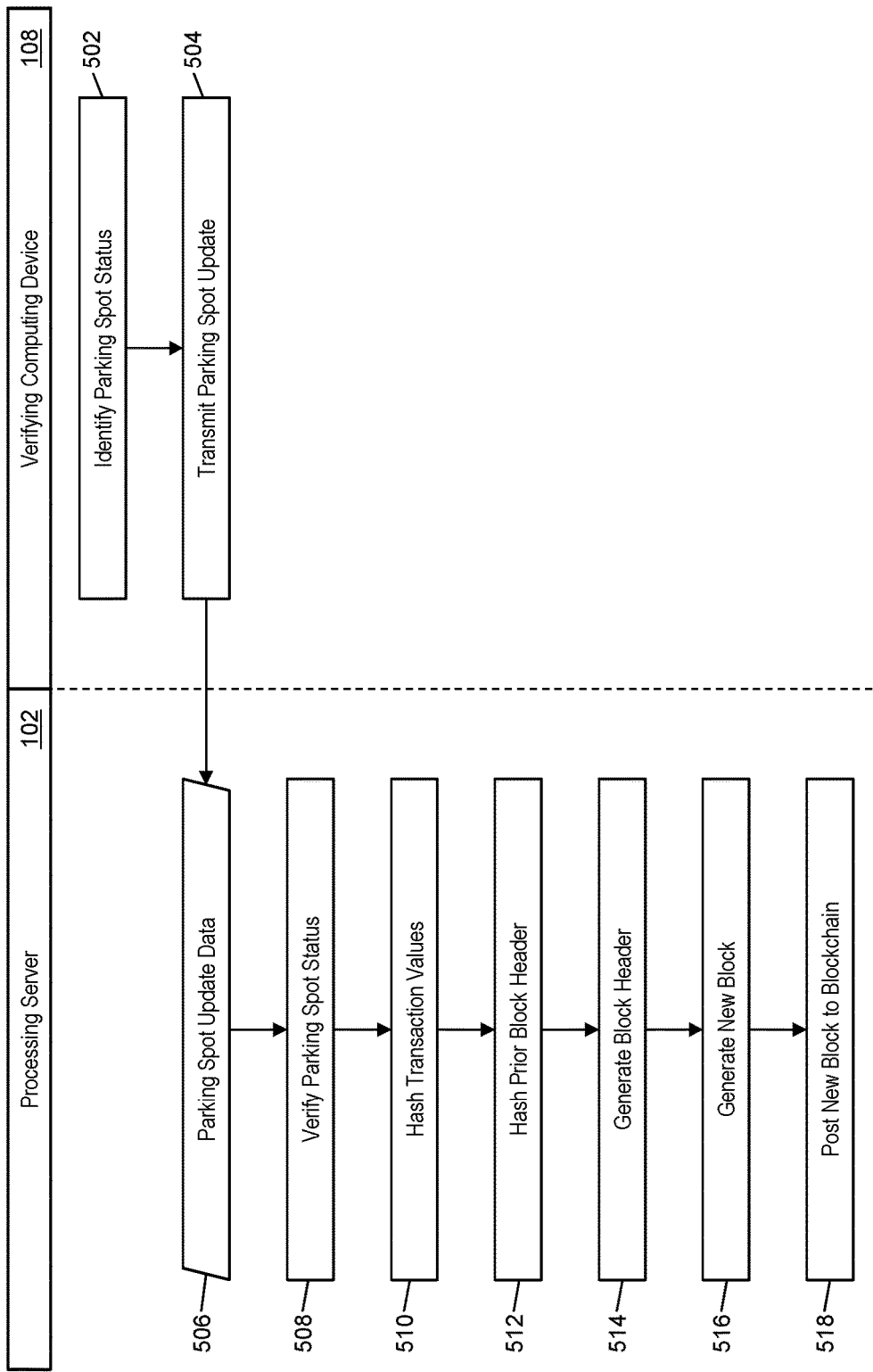
FIG. 5 is a flow diagram illustrating a process for distributing parking availability data to a blockchain in the system of FIG. 1 in accordance with exemplary embodiments.

Process for Identification and Distribution of Parking Availability Data Via Blockchain FIG. 5 illustrates a process for the identification of parking availability data for parking spaces and distribution thereof via a blockchain in the system 100 of FIG. 1.

In step 502, a plurality of verifying computing devices 108 may identify the status (e.g., availability data) of a parking space. In step 504, each of the verifying computing devices 108 may electronically transmit a spot availability notification for the parking space to the processing server 102 using a suitable communication network and method, where the spot availability notification includes the availability data for the parking space and a spot identifier associated therewith. In step 506, the receiving device 202 of the processing server 102 may receive the spot availability notifications for updating of the data for the parking space.

In step 508, the processing server 102 may verify the status of the parking space. Verification of the status may include verifying that the availability data in each of the received spot availability notifications for the parking space is the same and received within a predetermined period of time and/or that the availability data is different from the most recently updated availability data for the parking space in the associated blockchain. For instance, the querying module 216 of the processing server 102 may execute a query on the memory 224 to identify the most recent transaction value for the parking space added to the appropriate blockchain, to identify if the availability data included therein is different from the availability data received from the verifying computing devices 108. In step 510, the hashing module 220 of the processing server 102 may generate a transaction hash value via application of one or more hashing algorithms to a transaction value for the parking space, comprised of the spot identifier and availability data, and for any other parking spaces whose availability data is being updated on the blockchain. In some embodiments, the hashing module 220 may generate a Merkle tree using the one or more transaction values, wherein the transaction hash value may be the root of the Merkle tree. In step 512, the hashing module 220 of the processing server 102 may also generate a reference hash value via application of one or more hashing algorithms to the block header of the block most recently added to the blockchain, such as may be identified via a query executed by the querying module 216 of the processing server 102 using the timestamp included therein.

In step 514, the generation module 218 of the processing server 102 may generate a block header for a new block to be added to the blockchain. The block header may include at least a current timestamp and the transaction hash value and reference hash values generated by the hashing module 220. In step 516, the generation module 218 of the processing server 102 may generate a new block for addition to the blockchain. The new block may include at least the generated block header and the one or more transaction values that were hashed to generate the transaction hash value. In step 518, the transmitting device 222 of the processing server 102 may electronically transmit the newly generated block to one or more nodes of the blockchain network 106 associated with the blockchain for verification and adding to the blockchain.

Exemplary Method for Distributing Parking Availability Data Via Blockchain

Figure 6:
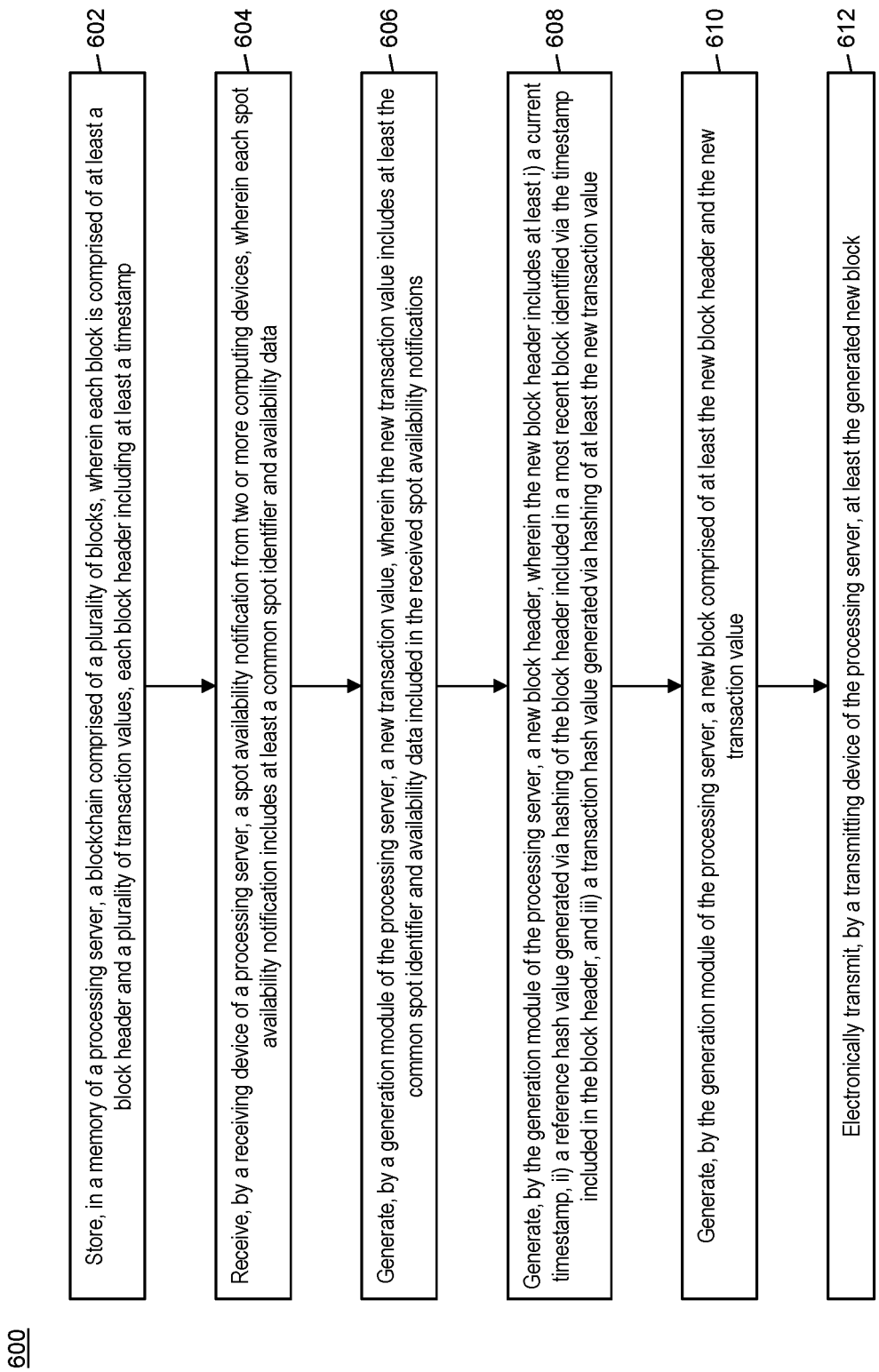
FIG. 6 is a flow chart illustrating an exemplary method for distributing parking availability data via blockchain in accordance with exemplary embodiments.

FIG. 6 illustrates a method 600 for the distribution of parking availability data for a parking space via a blockchain.

In step 602, a blockchain comprised of a plurality of blocks may be stored in a memory (e.g., the memory 224) of a processing server (e.g., the processing server 102), wherein each block is comprised of at least a block header and a plurality of transaction values, each block header including at least a timestamp. In step 604, a spot availability notification may be received from two or more computing devices (e.g., verifying computing devices 108) by a receiving device (e.g., the receiving device 202) of the processing server, wherein each spot availability notification includes at least a common spot identifier and availability data. In step 606, a new transaction value may be generated by a generation module (e.g., the generation module 218) of the processing server, wherein the new transaction value includes at least the common spot identifier and availability data included in the received spot availability notifications.

In step 608, a new block header may be generated by the generation module of the processing server, wherein the new block header includes at least i) a current timestamp, ii) a reference hash value generated via hashing of the block header included in a most recent block identified via the timestamp included in the block header, and iii) a transaction hash value generated via hashing of at least the new transaction value. In step 610, a new block may be generated by the generation module of the processing server comprised of at least the new block header and the new transaction value. In step 612, at least the generated new block may be electronically transmitted by a transmitting device (e.g., the transmitting device 222) of the processing server.

In one embodiment, the availability data may include at least one of: an indication of availability and an identifier associated with an occupying vehicle. In some embodiments, the method 600 may further include: storing, in a location database (e.g., the location database 206) of the processing server, a plurality of location data entries (e.g., location data entries 208), wherein each location data entry includes at least a blockchain identifier and at least one spot identifier; and executing, by a querying module (e.g., the querying module 216) of the processing server, a query on the location database to identify a specific location data entry wherein at least one of the at least one spot identifiers corresponds to the common spot identifier, and wherein the blockchain identifier included in the identified specific location data entry is associated with the blockchain. In a further embodiment, each location data entry may further include a geographic location associated with each at least one spot identifier.

Exemplary Method for Identifying Available Parking Locations Via Blockchain

Figure 7:
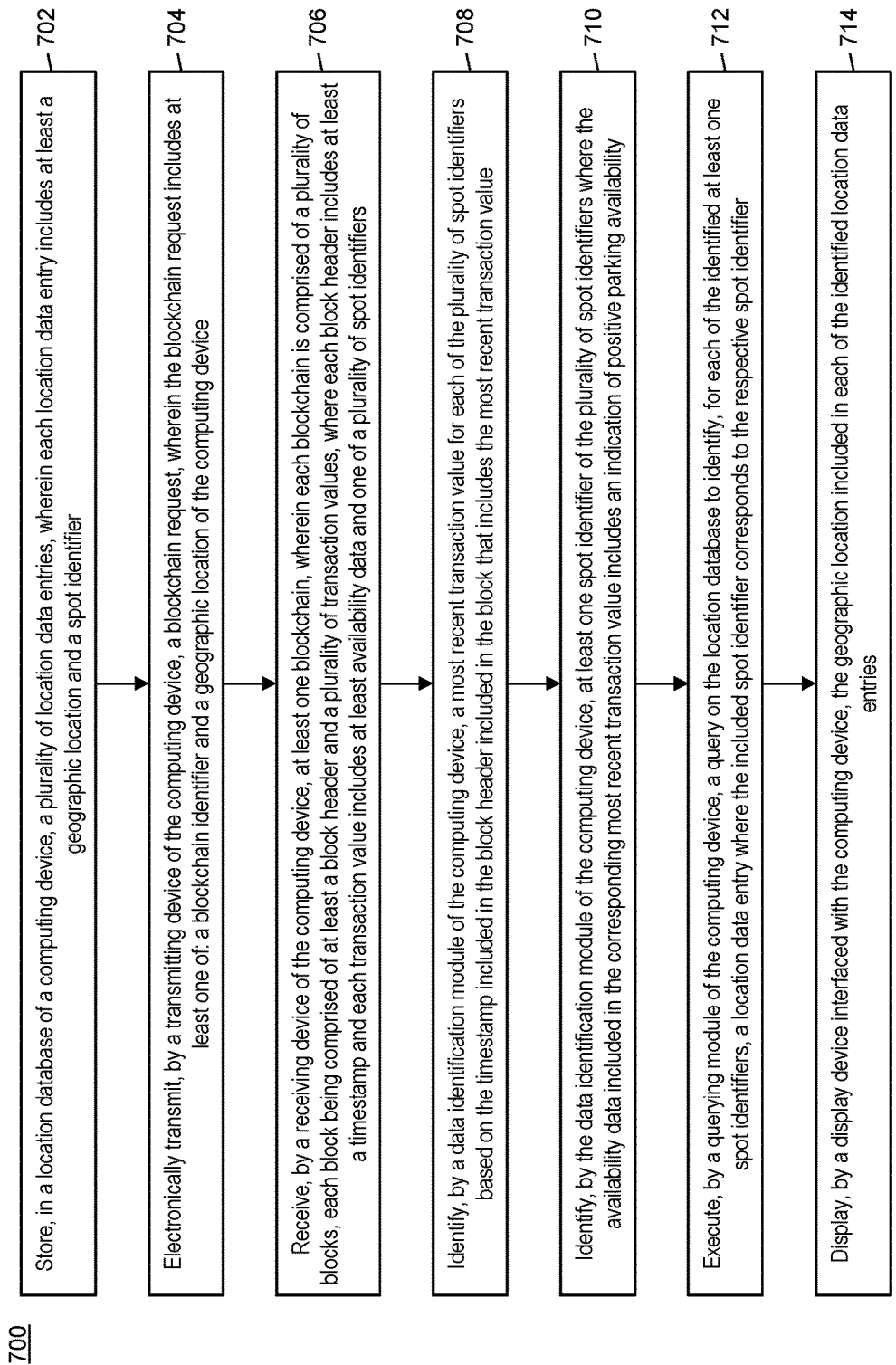
FIG. 7 is a flow chart illustrating an exemplary method for identifying available parking locations via blockchain in accordance with exemplary embodiments.

FIG. 7 illustrates a method 700 for the identification of parking spaces and availability of parking thereof in a geographic area via the use of blockchains.

In step 702, a plurality of location data entries (e.g. location data entries 308) may be stored in a location database (e.g., the location database 306) of a computing device (e.g., the user computing device 104), wherein each location data entry includes at least a geographic location and a spot identifier. In step 704, a blockchain request may be electronically transmitted by a transmitting device (e.g., the transmitting device 322) of the computing device, wherein the blockchain request includes at least one of: a blockchain identifier and a geographic location of the computing device.

In step 706, at least one blockchain may be received by a receiving device (e.g., the receiving device 302) of the computing device, herein each blockchain is comprised of a plurality of blocks, each block being comprised of at least a block header and a plurality of transaction values, where each block header includes at least a timestamp and each transaction value includes at least availability data and one of a plurality of spot identifiers. In step 708, a most recent transaction value may be identified by a data identification module (e.g., the data identification module 318) of the computing device for each of the plurality of spot identifiers based on the timestamp included in the block header included in the block that includes the most recent transaction value.

In step 710, at least one spot identifier of the plurality of spot identifiers may be identified by the data identification module of the computing device where the availability data included in the corresponding most recent transaction value includes an indication of positive parking availability. In step 712, a query may be executed on the location database by a querying module (e.g., the querying module 316) of the computing device to identify, for each of the identified at least one spot identifiers, a location data entry where the included spot identifier corresponds to the respective spot identifier. In step 714, the geographic location included in each of the identified location data entries may be displayed by a display device (e.g., the display device 320) interfaced with the computing device.

In one embodiment, the method 700 may also include identifying, by a geographic identification module (e.g., the data identification module 318) of the computing device, the geographic location of the computing device prior to transmission of the blockchain request. In some embodiments, display of the geographic location included in each of the identified location data entries may include displaying a map of the geographic location of the computing device, wherein the map includes an indication of the geographic location included in each of the identified location data entries. In a further embodiment, the map may further include an illustration of directions from the geographic location of the computing device to the geographic location included in at least one of the identified location data entries.

Computer System Architecture

Figure 8:
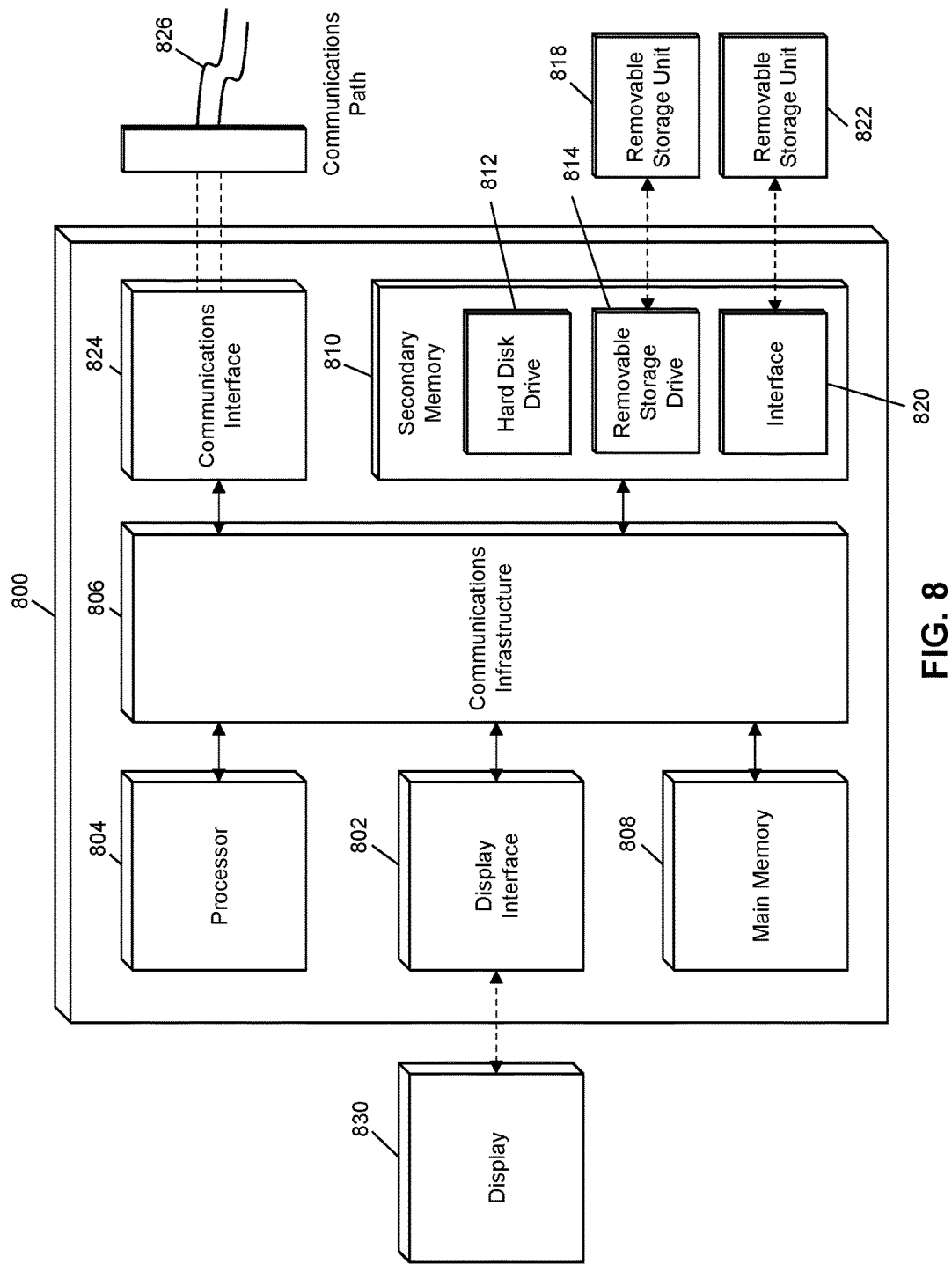
FIG. 8 is a block diagram illustrating a computer system architecture in accordance with exemplary embodiments.

FIG. 8 illustrates a computer system 800 in which embodiments of the present disclosure, or portions thereof, may be implemented as computer-readable code. For example, the processing server 102 and user computing device 104 of FIG. 1 may be implemented in the computer system 800 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 4-7.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 818, a removable storage unit 822, and a hard disk installed in hard disk drive 812.

Various embodiments of the present disclosure are described in terms of this example computer system 800. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 804 may be a special purpose or a general purpose processor device specifically configured to perform the functions discussed herein. The processor device 804 may be connected to a communications infrastructure 806, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 800 may also include a main memory 808 (e.g., random access memory, read-only memory, etc.), and may also include a secondary memory 810. The secondary memory 810 may include the hard disk drive 812 and a removable storage drive 814, such as a floppy disk drive, a magnetic tape drive, an optical disk drive, a flash memory, etc.

The removable storage drive 814 may read from and/or write to the removable storage unit 818 in a well-known manner. The removable storage unit 818 may include a removable storage media that may be read by and written to by the removable storage drive 814. For example, if the removable storage drive 814 is a floppy disk drive or universal serial bus port, the removable storage unit 818 may be a floppy disk or portable flash drive, respectively. In one embodiment, the removable storage unit 818 may be non-transitory computer readable recording media.

In some embodiments, the secondary memory 810 may include alternative means for allowing computer programs or other instructions to be loaded into the computer system 800, for example, the removable storage unit 822 and an interface 820. Examples of such means may include a program cartridge and cartridge interface (e.g., as found in video game systems), a removable memory chip (e.g., EEPROM, PROM, etc.) and associated socket, and other removable storage units 822 and interfaces 820 as will be apparent to persons having skill in the relevant art.

Data stored in the computer system 800 (e.g., in the main memory 808 and/or the secondary memory 810) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 800 may also include a communications interface 824. The communications interface 824 may be configured to allow software and data to be transferred between the computer system 800 and external devices. Exemplary communications interfaces 824 may include a modem, a network interface (e.g., an Ethernet card), a communications port, a PCMCIA slot and card, etc. Software and data transferred via the communications interface 824 may be in the form of signals, which may be electronic, electromagnetic, optical, or other signals as will be apparent to persons having skill in the relevant art. The signals may travel via a communications path 826, which may be configured to carry the signals and may be implemented using wire, cable, fiber optics, a phone line, a cellular phone link, a radio frequency link, etc.

The computer system 800 may further include a display interface 802. The display interface 802 may be configured to allow data to be transferred between the computer system 800 and external display 830. Exemplary display interfaces 802 may include high-definition multimedia interface (HDMI), digital visual interface (DVI), video graphics array (VGA), etc. The display 830 may be any suitable type of display for displaying data transmitted via the display interface 802 of the computer system 800, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 808 and secondary memory 810, which may be memory semiconductors (e.g., DRAMs, etc.). These computer program products may be means for providing software to the computer system 800. Computer programs (e.g., computer control logic) may be stored in the main memory 808 and/or the secondary memory 810. Computer programs may also be received via the communications interface 824. Such computer programs, when executed, may enable computer system 800 to implement the present methods as discussed herein. In particular, the computer programs, when executed, may enable processor device 804 to implement the methods illustrated by FIGS. 4-7, as discussed herein. Accordingly, such computer programs may represent controllers of the computer system 800. Where the present disclosure is implemented using software, the software may be stored in a computer program product and loaded into the computer system 800 using the removable storage drive 814, interface 820, and hard disk drive 812, or communications interface 824.

The processor device 804 may comprise one or more modules or engines configured to perform the functions of the computer system 800. Each of the modules or engines may be implemented using hardware and, in some instances, may also utilize software, such as corresponding to program code and/or programs stored in the main memory 808 or secondary memory 810. In such instances, program code may be compiled by the processor device 804 (e.g., by a compiling module or engine) prior to execution by the hardware of the computer system 800. For example, the program code may be source code written in a programming language that is translated into a lower level language, such as assembly language or machine code, for execution by the processor device 804 and/or any additional hardware components of the computer system 800. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 800 to perform the functions disclosed herein. It will be apparent to persons having skill in the relevant art that such processes result in the computer system 800 being a specially configured computer system 800 uniquely programmed to perform the functions discussed above.

Techniques consistent with the present disclosure provide, among other features, systems and methods for distributing parking availability and identifying available parking via blockchain. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for distributing parking availability data via blockchain, comprising:
    storing, in a memory of a processing server, a blockchain comprised of a plurality of blocks, wherein each block is comprised of at least a block header and a plurality of transaction values, each block header including at least a timestamp;
    receiving, by a receiving device of the processing server, a spot availability notification from two or more computing devices, wherein each spot availability notification includes at least a common spot identifier and availability data;
    generating, by a generation module of the processing server, a new transaction value, wherein the new transaction value includes at least the common spot identifier and availability data included in the received spot availability notifications;
    generating, by the generation module of the processing server, a new block header, wherein the new block header includes at least i) a current timestamp, ii) a reference hash value generated via hashing of the block header included in a most recent block identified via the timestamp included in the block header, and iii) a transaction hash value generated via hashing of at least the new transaction value;
    generating, by the generation module of the processing server, a new block comprised of at least the new block header and the new transaction value; and
    electronically transmitting, by a transmitting device of the processing server, at least the generated new block to a node of a blockchain network causing the blockchain network to add the generated new block to the blockchain.

2. The method of claim 1, wherein the availability data includes at least one of: an indication of availability and an identifier associated with an occupying vehicle.

3. The method of claim 1, further comprising:
    storing, in a location database of the processing server, a plurality of location data entries, wherein each location data entry includes at least a blockchain identifier and at least one spot identifier; and
    executing, by a querying module of the processing server, a query on the location database to identify a specific location data entry wherein at least one of the at least one spot identifiers corresponds to the common spot identifier, wherein
    the blockchain identifier included in the identified specific location data entry is associated with the blockchain.

4. The method of claim 3, wherein each location data entry further includes a geographic location associated with each at least one spot identifier.

5. A method for identifying available parking locations via blockchain, comprising:
    storing, in a location database of a computing device, a plurality of location data entries, wherein each location data entry includes at least a geographic location and a spot identifier;
    electronically transmitting, by a transmitting device of the computing device, a blockchain request to a particular blockchain network associated with a particular geographic location, wherein the blockchain request includes at least one of: a blockchain identifier and a geographic location of the computing device, wherein the computing device is configured to communicate with one or more nodes of blockchain networks;
    receiving, by a receiving device of the computing device, at least one blockchain, wherein each blockchain is comprised of a plurality of blocks, each block being comprised of at least a block header and a plurality of transaction values, where each block header includes at least a timestamp and each transaction value includes at least availability data and one of a plurality of spot identifiers;
    identifying, by a data identification module of the computing device, a most recent transaction value for each of the plurality of spot identifiers based on the timestamp included in the block header included in the block that includes the most recent transaction value;
    identifying, by the data identification module of the computing device, at least one spot identifier of the plurality of spot identifiers where the availability data included in the corresponding most recent transaction value includes an indication of positive parking availability;
    executing, by a querying module of the computing device, a query on the location database to identify, for each of the identified at least one spot identifiers, a location data entry where the included spot identifier corresponds to the respective spot identifier; and
    displaying, by a display device interfaced with the computing device, the geographic location included in each of the identified location data entries.

6. The method of claim 5, further comprising:
identifying, by a geographic identification module of the computing device, the geographic location of the computing device prior to transmission of the blockchain request.

7. The method of claim 5, wherein display of the geographic location included in each of the identified location data entries includes displaying a map of the geographic location of the computing device, wherein the map includes an indication of the geographic location included in each of the identified location data entries.

8. The method of claim 7, wherein the map further includes an illustration of directions from the geographic location of the computing device to the geographic location included in at least one of the identified location data entries.

9. A system for distributing parking availability data via blockchain, comprising:
a memory of a processing server configured to store a blockchain comprised of a plurality of blocks, wherein each block is comprised of at least a block header and a plurality of transaction values, each block header including at least a timestamp;
a receiving device of the processing server configured to receive a spot availability notification from two or more computing devices, wherein each spot availability notification includes at least a common spot identifier and availability data;
a generation module of the processing server configured to generate:
a new transaction value, wherein the new transaction value includes at least the common spot identifier and availability data included in the received spot availability notifications,
a new block header, wherein the new block header includes at least i) a current timestamp, ii) a reference hash value generated via hashing of the block header included in a most recent block identified via the timestamp included in the block header, and iii) a transaction hash value generated via hashing of at least the new transaction value, and
a new block comprised of at least the new block header and the new transaction value; and
a transmitting device of the processing server configured to electronically transmit at least the generated new block to a node of a blockchain network causing the blockchain network to add the generated new block to the blockchain.

10. The system of claim 9, wherein the availability data includes at least one of: an indication of availability and an identifier associated with an occupying vehicle.

11. The system of claim 9, further comprising:
a location database of the processing server configured to store a plurality of location data entries, wherein each location data entry includes at least a blockchain identifier and at least one spot identifier; and
a querying module of the processing server configured to execute a query on the location database to identify a specific location data entry wherein at least one of the at least one spot identifiers corresponds to the common spot identifier, wherein
the blockchain identifier included in the identified specific location data entry is associated with the blockchain.

12. The system of claim 11, wherein each location data entry further includes a geographic location associated with each at least one spot identifier.

13. A system for identifying available parking locations via blockchain, comprising:
a location database of a computing device configured to store a plurality of location data entries, wherein each location data entry includes at least a geographic location and a spot identifier;
a transmitting device of the computing device configured to electronically transmit a blockchain request to a particular blockchain network associated with a particular geographic location, wherein the blockchain request includes at least one of: a blockchain identifier and a geographic location of the computing device, and wherein the computing device is configured to communicate with one or more nodes of blockchain networks;
a receiving device of the computing device configured to receive at least one blockchain, wherein each blockchain is comprised of a plurality of blocks, each block being comprised of at least a block header and a plurality of transaction values, where each block header includes at least a timestamp and each transaction value includes at least availability data and one of a plurality of spot identifiers;
a data identification module of the computing device configured to:
identify a most recent transaction value for each of the plurality of spot identifiers based on the timestamp included in the block header included in the block that includes the most recent transaction value, and
identify at least one spot identifier of the plurality of spot identifiers where the availability data included in the corresponding most recent transaction value includes an indication of positive parking availability;
a querying module of the computing device configured to execute a query on the location database to identify, for each of the identified at least one spot identifiers, a location data entry where the included spot identifier corresponds to the respective spot identifier; and
a display device interfaced with the computing device configured to display the geographic location included in each of the identified location data entries.

14. The system of claim 13, further comprising:
a geographic identification module of the computing device configured to identify the geographic location of the computing device prior to transmission of the blockchain request.

15. The system of claim 13, wherein display of the geographic location included in each of the identified location data entries includes displaying a map of the geographic location of the computing device, wherein the map includes an indication of the geographic location included in each of the identified location data entries.

16. The system of claim 15, wherein the map further includes an illustration of directions from the geographic location of the computing device to the geographic location included in at least one of the identified location data entries.

* * * * *